US010766083B2

(12) United States Patent
Yan et al.

(10) Patent No.: US 10,766,083 B2
(45) Date of Patent: Sep. 8, 2020

(54) SPIRAL FLUTE TAP WITH CONTINUOUSLY INCREASING HELIX ANGLE

(71) Applicant: Kennametal Inc., Latrobe, PA (US)

(72) Inventors: Yan Yan, Greensboro, NC (US); Stephen Michael George, Greensboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 70 days.

(21) Appl. No.: 15/609,222

(22) Filed: May 31, 2017

(65) Prior Publication Data

US 2018/0345394 A1     Dec. 6, 2018

(51) Int. Cl.
*B23G 5/06*      (2006.01)
*B24B 3/20*      (2006.01)

(52) U.S. Cl.
CPC .................. *B23G 5/06* (2013.01); *B24B 3/20* (2013.01); *B23G 2200/40* (2013.01); *B23G 2200/48* (2013.01); *B23G 2240/08* (2013.01); *Y10T 408/9048* (2015.01); *Y10T 408/90467* (2015.01)

(58) Field of Classification Search
CPC .. B23G 5/06; B23G 2200/40; B23G 2200/48; Y10T 408/9048; Y10T 408/904; Y10T 408/9046; Y10T 408/90467; B24B 3/20
See application file for complete search history.

(56) References Cited

U.S. PATENT DOCUMENTS

| 5,127,776 | A | | 7/1992 | Glimpel | |
|---|---|---|---|---|---|
| 5,222,847 | A | | 6/1993 | Hiyama et al. | |
| 5,584,617 | A | * | 12/1996 | Houser | B23B 51/02 408/1 R |
| 5,664,915 | A | | 9/1997 | Hawke | |
| 6,652,203 | B1 | * | 11/2003 | Risen, Jr. | B23B 51/02 408/225 |
| 7,357,606 | B1 | | 4/2008 | Pettit et al. | |
| 7,950,880 | B2 | * | 5/2011 | Henderer | B23G 5/06 408/222 |
| 2003/0118411 | A1 | | 6/2003 | Flynn et al. | |
| 2004/0247406 | A1 | * | 12/2004 | Malagnino | B23G 5/06 408/222 |

(Continued)

FOREIGN PATENT DOCUMENTS

JP     2008272856 A  * 11/2008

*Primary Examiner* — Eric A. Gates
*Assistant Examiner* — Chwen-Wei Su
(74) *Attorney, Agent, or Firm* — Larry R. Meenan

(57) ABSTRACT

A spiral flute tap includes a body having an axial forward end and an axial rearward end. The body has a cylindrical shank portion adjacent the axial rearward end, a threaded fluted portion adjacent the axial forward end, a non-threaded fluted portion between the cylindrical shank portion and the threaded fluted portion, and a central, longitudinal axis. The spiral flute tap further includes a plurality of helical flutes formed at a helix angle, HA, with respect to the central, longitudinal axis of the tap that continuously increases in magnitude in the threaded fluted portion. In other words, the lead of the plurality of helical flutes continuously decreases in magnitude in a rearward direction for a predetermined distance. In one example, the helix angle, HA, varies at a rate of between 0.5 degrees/mm to 4.0 degrees/mm. A method of making the spiral flute tap is also disclosed.

19 Claims, 2 Drawing Sheets

(56) References Cited

U.S. PATENT DOCUMENTS

| | | | |
|---|---|---|---|
| 2004/0258493 A1* | 12/2004 | Sugano | B23G 5/06 408/222 |
| 2005/0105973 A1 | 5/2005 | MacArthur | |
| 2005/0187026 A1* | 8/2005 | Henderer | B23G 5/06 470/198 |
| 2009/0016832 A1* | 1/2009 | Onose | B23B 51/02 408/59 |
| 2009/0214311 A1 | 8/2009 | Nakajima et al. | |
| 2010/0092257 A1* | 4/2010 | Henderer | B23G 5/06 408/222 |
| 2010/0260566 A1 | 10/2010 | Glimpel et al. | |
| 2011/0020087 A1 | 1/2011 | Yamamoto et al. | |
| 2012/0134761 A1 | 5/2012 | Nakajima et al. | |
| 2013/0236260 A1 | 9/2013 | Henderer et al. | |
| 2015/0016911 A1* | 1/2015 | Ito | B23G 5/06 408/222 |
| 2016/0045995 A1 | 2/2016 | Burns | |

\* cited by examiner

SPIRAL FLUTE TAP WITH CONTINUOUSLY INCREASING HELIX ANGLE

FIELD OF THE INVENTION

The present invention relates to a cutting tap and, more particularly, to a spiral flute tap with a threaded fluted portion with a continuously increasing flute helix or a continuously decreasing flute lead.

BACKGROUND OF THE INVENTION

It is known in the art to form flutes at a low helix angle (i.e. high lead) or a high helix angle (i.e. low lead). A "low helix" (or low helical flute) is a flute that helically "winds" around a cylinder at an angle of no more than 45 degrees. A "super" slow-helical flute would be a flute that winds around a cylinder at an angle of at no more than 15 degrees. A "high helix" (or high helical flute) is a flute that helically winds around a cylinder at an angle of greater than 45 degrees, while a "super" high-helical flute winds around a cylinder at an angle of at least 65 degrees. Low helix angle flutes are typically employed for rough cutting while high helix angle flutes are employed for finish cutting.

Straight flute or slow helix spiral flute is widely used in shallow blind hole tapping. They have better mechanical strength than high helix spiral flute and can usually generate tightly-curled chips. However, they cannot be applied to deep hole tapping due to its limited chip lifting force. A high helix flute (or low lead) is required for chip evacuation, but are often subject to bird nesting or chip wrap.

Approximately 60% of all tapping is in blind hole applications and most these holes are tapped with spiral flute taps. Long chipping materials require a fast spiral flute helix angle (>30°) which is also subject to bird nesting or chip wrap. This is one of the most challenging problem in the tapping world. None of the tap existing on the market today truly solves this problem.

The present invention has been developed in view of the foregoing.

SUMMARY OF THE INVENTION

The problem of bird nesting or chip wrap is solved by providing a tap having both a slow helix spiral flute angle and a fast spiral flute helix angle. Specifically, the present invention provides a tap with a variable helix spiral flute geometry that features a slow-to-fast flute helix change from the axial forward end of the tap toward the axial rearward end, which is the opposite of conventional fast-to-slow designs. The rate of slow-to-fast flute helix change can be constant or non-constant. In other words, the lead, which is inversely proportional to the tangent of the helix angle, continuously decreases from the axial forward end toward the axial rearward end of the tap. Tests indicate that bird nesting is successfully eliminated.

In one aspect of the invention, a spiral flute tap comprising a body having an axial forward end and an axial rearward end, the body having a cylindrical shank portion adjacent the axial rearward end, a threaded fluted portion adjacent the axial forward end, a non-threaded fluted portion between the cylindrical shank portion and the threaded fluted portion, and a central, longitudinal axis, wherein the threaded fluted portion and the non-threaded fluted portion of the spiral flute tap further comprises a plurality of helical flutes formed at a helix angle, HA, with respect to the central, longitudinal axis of the tap, and wherein the lead of the plurality of helical flutes of the threaded fluted portion continuously decreases in magnitude in a rearward direction for a predetermined distance from the axial forward end toward the axial rearward end.

In another aspect of the invention, a spiral flute tap comprising a body having an axial forward end and an axial rearward end, the body having a cylindrical shank portion adjacent the axial rearward end, a threaded fluted portion adjacent the axial forward end, a non-threaded fluted portion between the cylindrical shank portion and the threaded fluted portion, and a central, longitudinal axis, the spiral flute tap further comprising a plurality of helical flutes formed at a helix angle, HA, with respect to the central, longitudinal axis of the tap, wherein the helix angle, HA, continuously increases in magnitude from the axial forward end toward the non-threaded fluted portion at a rate of between 0.5 degrees/mm to 4.0 degrees/mm.

In yet another aspect of the invention, a method of making a spiral flute tap comprises the steps of:
grinding a cylindrical shank to form a cylindrical shank portion at an axial rearward end of the tap and a threaded body portion having a major diameter at an axial forward end of the tap;
grinding a spiral flute in the threaded body portion to form a cutting edge;
grinding the threaded body portion with a taper to form a chamfered fluted section; and
grinding the threaded body portion to form a cutting thread, whereby the spiral flute is formed at a helix angle, HA, with respect to the central, longitudinal axis of the tap such that the lead of the spiral flute continuously decreases in magnitude starting at the axial forward end of the tap toward the axial rearward end for a predetermined distance.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
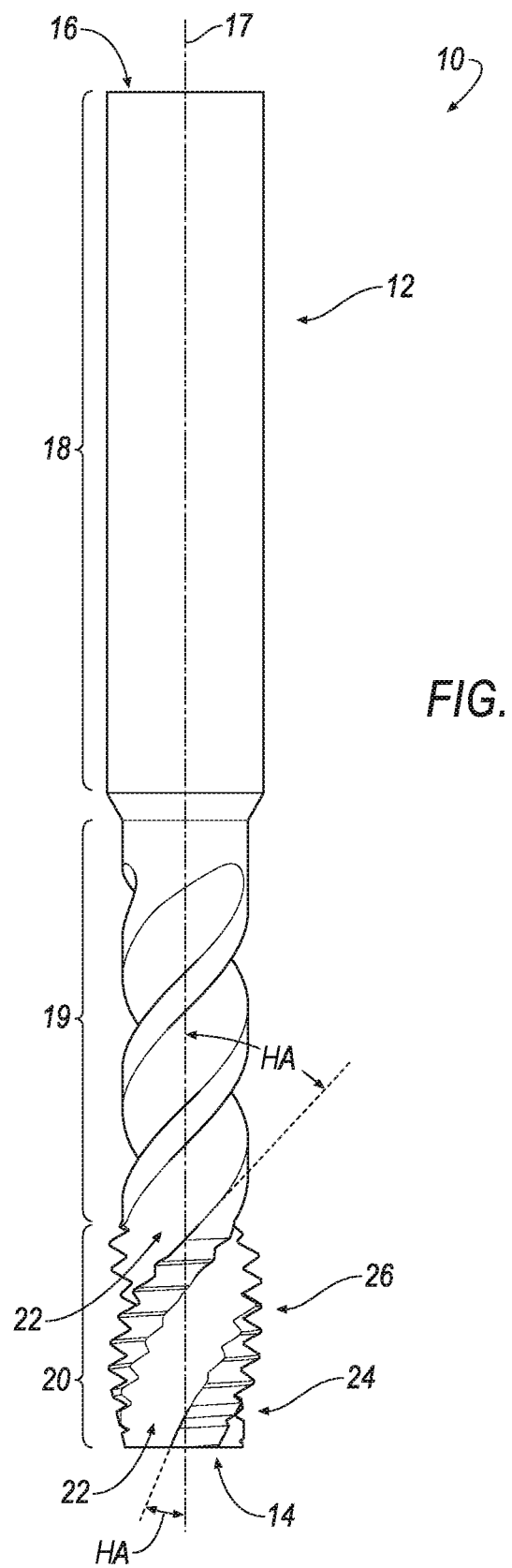
FIG. 1 is a side elevational view of a spiral flute tap in accordance with an aspect of the invention.

Referring now to FIG. 1, a cutting tap 10 is shown according to an embodiment of the invention. The cutting tap 10 has an elongate body 12 with an axial forward end 14, an axial rearward end 16, and a central, longitudinal axis 17. The cutting tap 10 has a cylindrical shank portion (bracket 18) adjacent to the axial rearward end 16, a non-threaded fluted portion (bracket 19), and a threaded fluted portion (bracket 20) adjacent to the axial forward end 14. The shank portion 18 may have a relatively larger diameter than the non-threaded fluted portion 19 and the threaded fluted portion 20. The shank portion 18 might optionally have a square (not shown) for securing the tap 10 from turning in a tool holder (not shown). The non-threaded fluted portion 19 and the threaded fluted portion 20 of the cutting tap 10 includes a plurality of spiral, helical flutes 22 formed with a helix angle, HA, with respect to the central, longitudinal axis 17 of the tap 10.

It will be appreciated that the lead is a function of the helix angle, HA, and the diameter, D, of the tap 10 according to the following equation:

$$\text{Lead}=\pi*D/\tan(\text{Helix Angle}) \qquad \text{Eq. 1}$$

As shown in Eq. 1, the lead is proportional to the diameter, D, of the tap 10 and inversely proportional to the tangent of the helix angle, HA. In other words, the lead changes if the diameter, D, and/or the helix angle, HA, changes.

The cutting tap 10 is operatively connected by a tool holder to a machine tool (not shown) or the like at the cylindrical shank portion 18 thereof. The threaded fluted portion 20 has a chamfered fluted section 24 beginning at the axial forward end 14 and extending in an axial rearward direction therefrom. The chamfered region 24 joins a constant diameter (or finishing) section 26 that extends in the axial rearward direction terminating at the juncture with the non-threaded fluted portion 19.

Regarding specific tapping applications, spiral flute taps with a right-hand helix pull the chips out of the hole (right-hand thread) and are effective in blind holes. Left-hand spiral fluted taps direct the chip ahead of the tap (right-hand thread) and are effective in through holes. Taps with straight flutes are typically effective in materials such as cast iron that produce a short chip. In straight-flute taps, the flutes convey the chips out of the hole by storing them.

Figure 2:
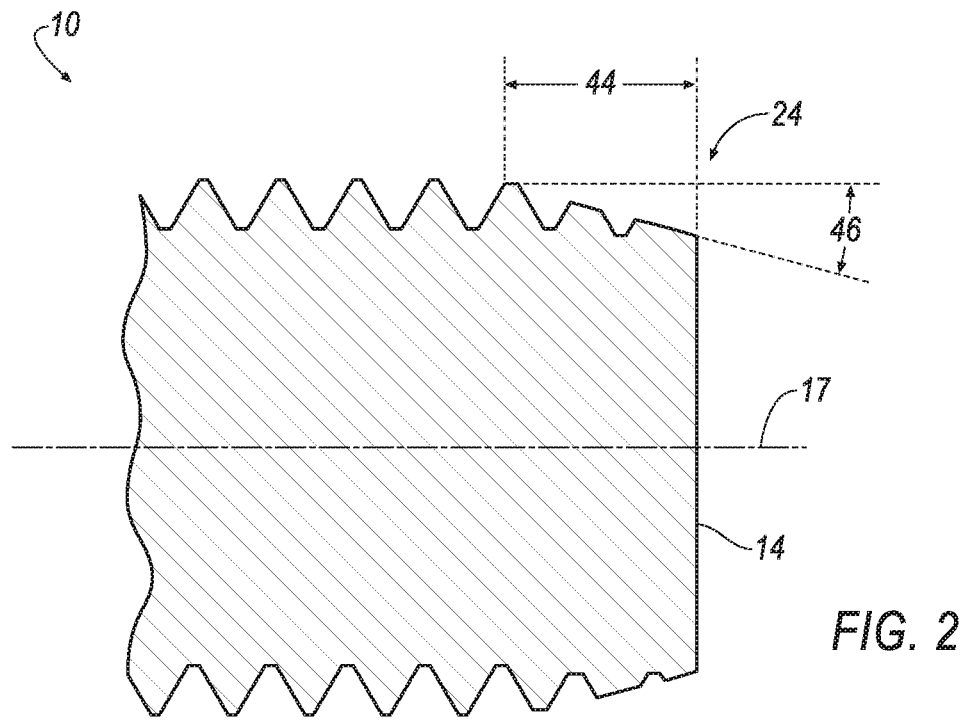
FIG. 2 is a partial, enlarged cross-sectional view of the threaded body portion of the axial forward end of the spiral flute tap of FIG. 1.
Figure 3:
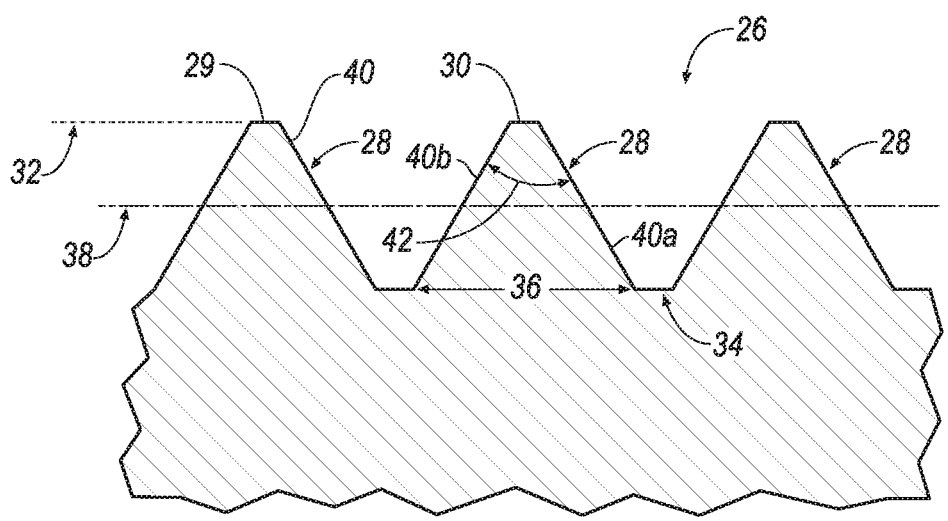
FIG. 3 is a partial, enlarged cross-sectional view of the constant-diameter fluted section of the spiral flute tap of FIG. 1.

Referring now to FIGS. 2 and 3, the construction of the tap 10 and details about the chamfered flute section 24 will now be described. The chamfered fluted section 24 has a length 44 and is formed at an angle 46 with respect to the central, longitudinal axis 17. The constant diameter (or finishing) fluted section 26 has a series of V-shaped cutting threads, shown generally at 28. Each cutting thread 28 has a cutting edge 29 and is truncated by a crest 30 at the major diameter 32 and a root 34 at the minor diameter 36. A pitch diameter 38, defined as the diameter in between the major and minor diameters 32, 36 effectively defines the location of a left thread flank 40a and a right thread flank 40b with respect to the longitudinal axis 17 of the cutting tap 10.

Although FIG. 3 shows a thread 28 with an included angle 42 between the thread flanks 40a, 40b of about 60 degrees, it should be appreciated that other angles are possible. For example, the included angle 42 can be in the range between about 30 degrees and about 90 degrees. After tapping, the thread flanks 40a, 40b and the thread crest 30 contact the newly generated internal thread. Generally, the minor diameter 36 of the tap 10 is intentionally designed to be larger than the minor diameter of the hole (not shown), and therefore, does not contact the internal thread.

The cutting tap 10 generates an internal thread form by the succession of cutting edges 29 formed by fluting the threaded fluted portion of the tap 10. Material is removed from the wall of the hole until the final thread form is obtained with the first full thread 28 on the constant diameter (or finishing) fluted section 26 of the tap 10. Threads past the first full thread 28 of the tap 10 are used to guide the tap 10 accurately and allow the tap 10 to be re-sharpened after use.

Referring back to FIG. 1, one aspect of the invention is that the helix angle, HA, of the helical flutes 22 of the threaded fluted portion 20 continuously increase in an axial rearward direction starting at the axial forward end 14 toward the axial rearward end 16 of the tap 10 until the helix angle, HA, reaches a maximum, predetermined value. In one example, the maximum, predetermined value may be about 60 degrees. Specifically, the helix angle, HA, of the helical flutes 22 of the threaded fluted portion 20 at the axial forward end 14 (i.e., the starting helix angle, HA) is relatively smaller in magnitude as compared to the helix angle, HA, of the helical flutes 22 of the threaded fluted portion 20 proximate the non-threaded fluted portion 19 (i.e. the ending helix angle, HA). In other words, the helix angle, HA, of the helical flutes 22 of the threaded fluted portion 20 gradually and continuously increases in magnitude in an axial rearward direction starting at the axial forward end 14 of the tap 10 until the helix angle, HA, reaches a maximum, predetermined value.

As mentioned earlier, the lead of the helical flutes 22 is inversely proportional to the tangent of the helix angle, HA. Thus, the lead of the helical flutes 22 of the threaded fluted portion 20 starting at the axial forward end 14 is relatively larger in magnitude than the lead of the helical flute 22 proximate the non-threaded fluted portion 19. It should be noted that, even though the diameter of the tap 10 decreases in the non-threaded fluted portion 19, the lead continuously decreases in the non-threaded fluted portion 20. In other words, the lead of the helical flutes 22 of the threaded fluted portion 20 and the non-threaded fluted portion 19 continuously decrease in magnitude for a predetermined distance in an axial rearward direction starting from the axial forward end 14 toward the axial rearward end 16 of the tap 10 until the lead reaches a minimum, predetermined value.

It is noted that the lead of the helical flutes 22 is also proportional to the diameter, D, of the tap 10. It is also noted that the non-threaded fluted portion 19 has a relatively smaller diameter than the threaded fluted portion 20. However, the lead of the helical flutes 22 continues to decrease in the non-threaded fluted portion 19 of the tap 10, even though the helix angle, HA, of the helical flutes 22 may decrease in the non-threaded fluted portion 19, In one example of the invention, the starting helix angle, HA, of the helical flutes 22 in the threaded fluted portion 20 can be between about 0 degrees and about 40 degrees, and the helix angle, HA, proximate the non-threaded fluted portion 19 can be between about 20 degrees and about 60 degrees. In one embodiment, the helix angle, HA, of the helical flutes 22 of the threaded fluted portion 20 continuously increases in magnitude at a rate of between about 0.5 degrees/mm to about 4.0 degrees/mm in the axial rearward direction of the tap 10. In other words, the lead, which is inversely proportional to the tangent of the continuously increasing helix angle, HA, continuously decreases in a rearward direction starting at the axial forward end 14 of the tap 10.

In another example of the invention, the starting helix angle, HA, of the helical flutes 22 in the threaded fluted portion 20 can be about 30 degrees and the ending helix angle, HA, can be about 50 degrees. In this embodiment, the helix angle, HA, continuously increases at a rate of about 1.25 degrees/mm in a rearward direction starting at the axial forward end 14 of the tap 10. It should be appreciated that the rate of change of the helix angle, HA, of the helical flutes 22 in the threaded fluted portion 20 need not be constant, and that the invention can be practiced with any desirable rate of increase of the helix angle, HA.

Tests have shown that the continuously increasing helix angle, HA, of the threaded fluted portion 20 of the cutting tap 10 of the invention (i.e. continuously decreasing lead in the threaded fluted portion 20 and the non-threaded fluted portion 19) provides superior chip evacuation performance (i.e. less bird nesting or chip wrap) and a reduction of cutting forces, as compared to conventional cutting tap designs. The reduction of cutting forces provides a significant increase in tool life and a reduction in bird nesting or chip wrap, as compared to conventional cutting tap designs.

The tap 10 is manufactured from either a substrate comprised of tungsten carbide cemented with cobalt or from high-speed steel. The first step in processing the substrate is to grind the blank to precision cylindrical tolerances by methods, such as cylindrical traverse grinding on centers or by centerless infeed grinding methods. During this step, a cylindrical shank is ground to size to form the cylindrical shank portion 18 at the axially rearward end 16 of the tap 10, and the major diameter 38 of the threaded fluted portion 20 is formed at the axially forward end 14 of the tap 10. In general, the diameter of the cylindrical shank portion 18 is approximately equal to the nominal thread diameter, but the diameter of the cylindrical shank portion 18 may be smaller than the nominal thread diameter for large diameter taps, and alternatively larger for small diameter taps. An option may include the grinding of the blank as part of the shank at the extreme axially rearward end of the tap 10.

In the next step, one or more helical flutes 22 having a continuously decreasing lead are ground to provide cutting edges 44, in combination with the chamfer. The helical flutes 22 may be either right or left hand in any combination with either right or left hand threads. CNC tool grinders can be programmed to generate the invented shape.

In the next step, the threaded fluted portion 20 is ground to form V-shaped thread flank surfaces 40, along with minor and major diameters 36 and 32, on a helix. The V-shaped thread flank surfaces 40 and major diameter 38 replicate the internal screw thread that is generated during tapping. Depending on the tapping application, the thread flank surfaces 40 and the minor and major diameters 36, 32 may or may not be relieved.

The chamfered fluted section 24 of the threaded fluted portion 20 is ground with a taper at an angle 46 to allow entry in the hole to be tapped and with a chamfer surface of increasing relief from the cutting edge to a point where the relief reaches a maximum, at an angle smaller than the land angle, and thereafter the chamfer surface has diminishing relief to create a small clearance at the heel of the tap. Although it is possible to produce this shape on straight fluted taps with conventional grinding machines where the relief is generated by cams, it is impossible to generate this shape on spiral fluted taps by this technique. CNC tool grinders can be programmed to generate the invented shape.

After grinding, the tap 10 may be honed with abrasive media or abrasive brushes to form a small radius on the cutting edges and other sharp corners. The resulting radius may be between 0 and 100 microns. This honing further increases the strength of these edges.

Next, the tap 10 may be optionally coated with a wear resistant layer (not shown) of metal nitrides, carbides, carbonitrides, borides and/or oxides, wherein the metal is chosen from one or more of the following: aluminum, silicon and the transition metals from Groups IVa, Va, and VIa of the Periodic Chart. This layer is deposited as a single monolayer or in multiple, including alternating, layers. Low friction layers can also be deposited on top of these wear resistant layers.

In the final step of the process, the rake face may be polished after the wear resistant layer has been applied.

As described above, the spiral flute tap of the invention has a plurality of spiral, helical flutes that are formed with a helix angle, HA, that continuously increases (i.e. continuously decreasing lead) from the axial forward end toward the axial rearward end of the tap until the helix angle, HA, reaches a maximum, predetermined value. The continuously increasing helix angle, HA, produces a tap with superior performance characteristics, such as longer tool life, and chip evacuation (less bird nesting or chip wrap), as compared to conventional tap designs.

The patents and publications referred to herein are hereby incorporated by reference.

Having described presently preferred embodiments the invention may be otherwise embodied within the scope of the appended claims.

What is claimed is:

1. A spiral flute tap comprising a body having an axial forward end and an axial rearward end, the body having a cylindrical shank portion adjacent the axial rearward end, a threaded fluted portion adjacent the axial forward end, a non-threaded fluted portion between the cylindrical shank portion and the threaded fluted portion, and a central, longitudinal axis, wherein the threaded fluted portion and the non-threaded fluted portion of the spiral flute tap further comprises a plurality of helical flutes formed at a helix angle, HA, with respect to the central, longitudinal axis of the tap, and wherein the helix angle, HA, increases in magnitude at a constant rate of change, in a rearward direction for a predetermined distance from the axial forward end toward the axial rearward end.

2. The spiral flute tap according to claim 1, wherein a lead of the plurality of helical flutes of the non-threaded fluted portion continuously decrease in magnitude.

3. The spiral flute tap according to claim 1, wherein the helix angle, HA, of the helical flutes at the axial forward end is between 0 degrees and 40 degrees, and the helix angle, HA, proximate the non-threaded fluted portion is between 20 degrees and 60 degrees.

4. The spiral flute tap according to claim 1, wherein the helix angle, HA, of the helical flutes at the axial forward end is 30 degrees and the helix angle, HA, proximate the non-threaded fluted portion is 50 degrees.

5. The spiral flute tap according to claim 1, wherein the helix angle, HA, varies at a rate of 1.25 degrees/mm from the axial forward end to proximate the non-threaded fluted portion of the tap.

6. The spiral flute tap according to claim 1, wherein the threaded fluted portion includes a chamfered fluted section and a constant diameter section, the chamfered fluted section extending from the axial forward end and terminating at the constant diameter section, the constant diameter section including at least one cutting thread, and a cutting edge formed at an intersection between the spiral flute and the at least one cutting thread.

7. The spiral flute tap according to claim 6, wherein the chamfered fluted section has a length and is formed at an angle with respect to the central, longitudinal axis.

8. The spiral flute tap according to claim 1, wherein the helix angle, HA, continuously and constantly increases in magnitude at a constant rate of change, from the axial forward end toward the non-threaded fluted portion at a rate of between 0.5 degrees/mm to 4.0 degrees/mm.

9. The spiral flute tap according to claim 8, wherein a lead of the plurality of helical flutes of the threaded fluted portion continuously decreases for a predetermined distance.

10. The spiral flute tap according to claim 8, wherein the helix angle, HA, of the helical flutes at the axial forward end is between 0 degrees and 40 degrees, and the helix angle, HA, proximate the non-threaded fluted portion is between 20 degrees and 60 degrees.

11. The spiral flute tap according to claim 8, wherein the helix angle, HA, of the helical flutes at the axial forward end is 30 degrees and the helix angle, HA, proximate the non-threaded fluted portion is 50 degrees.

12. The spiral flute tap according to claim 8, wherein the helix angle, HA, varies at a rate of 1.25 degrees/mm from the axial forward end toward the non-threaded fluted portion of the tap.

13. The spiral flute tap according to claim 8, wherein the threaded fluted portion includes a chamfered fluted section and a constant diameter section, the chamfered fluted section extending from the axial forward end and terminating at the constant diameter section, the constant diameter section including at least one cutting thread, and a cutting edge formed at an intersection between the spiral flute and the at least one cutting thread.

14. The spiral flute tap according to claim 13, wherein the chamfered fluted section has a length and is formed at an angle with respect to the central, longitudinal axis.

15. The spiral flute tap according to claim 1, wherein the helix angle, HA, varies at the constant rate of change from the axial forward end to proximate the non-threaded fluted portion of the tap.

16. The spiral flute tap according to claim 1, wherein a lead of the plurality of helical flutes of the threaded fluted portion continuously decreases for a predetermined distance.

17. A method of making a spiral flute tap, comprising the steps of:
grinding a cylindrical shank to form a cylindrical shank portion at an axial rearward end of the tap and a threaded body portion having a major diameter at an axial forward end of the tap;
grinding a spiral flute in the threaded body portion to form a cutting edge;
grinding the threaded body portion with a taper to form a chamfered fluted section; and
grinding the threaded body portion to form a cutting thread, whereby the spiral flute is formed at a helix angle, HA, with respect to the central, longitudinal axis of the tap such that the helix angle, HA, increases in magnitude at a constant rate of change, starting at the axial forward end of the tap toward the axial rearward end for a predetermined distance.

18. The method according to claim 17, wherein the helix angle, HA, of the spiral flute at the axial forward end is between 0 degrees and 40 degrees, and the helix angle, HA, proximate the shank portion is between 20 degrees and 60 degrees.

19. The method according to claim 17, wherein the helix angle, HA, varies at a rate of between 0.5 degrees/mm to 4.0 degrees/mm from the axial forward end to proximate the shank portion of the tap.

* * * * *